United States Patent [19]

Anderson

[11] 4,338,059
[45] Jul. 6, 1982

[54] CABLE REEL HANDLING APPARATUS FOR A VEHICLE

[75] Inventor: James E. Anderson, West Des Moines, Iowa

[73] Assignee: Mid-America Body & Equipment Co., Des Moines, Iowa

[21] Appl. No.: 171,732

[22] Filed: Jul. 24, 1980

[51] Int. Cl.$^3$ .............................................. B60P 1/48
[52] U.S. Cl. ............................... 414/501; 242/86.5 R; 414/546; 414/911
[58] Field of Search .............. 242/86.5 R, 86.7, 86.8, 242/58.6; 414/501, 546, 555, 525 R, 911

[56] References Cited

U.S. PATENT DOCUMENTS

| | | | |
|---|---|---|---|
| 3,067,966 | 12/1962 | Hicks | 242/58.6 X |
| 3,298,667 | 1/1967 | Grantham et al. | 242/58.6 X |
| 3,458,185 | 7/1969 | Merrill | 242/58.6 X |
| 3,902,612 | 9/1975 | Hall | 242/86.5 R |
| 4,103,794 | 8/1978 | Shaw | 414/501 |
| 4,155,518 | 5/1979 | Small | 242/86.5 R |
| 4,228,967 | 10/1980 | Woodruff | 242/86.5 R |

FOREIGN PATENT DOCUMENTS 1338396 8/1963 France .............................. 242/58.6

Primary Examiner—John M. Jillions
Attorney, Agent, or Firm—Rudolph L. Lowell

[57] ABSTRACT

The cable reel handling apparatus is mountable on a truck and operable to separately lift and move a pair of reels from ground supported positions rearwardly of the truck to transfer positions substantially centered relative to the truck rear wheel and axle assembly and between side compartment units that project above the truck bed and extend longitudinally over the length of the bed. A carriage structure is movable on tracks located above the side compartment units between a forward reel transport position and a rearward reel loading position in which the first reel to be transported is directly transferred by vertically movable lift arms mounted at the rear end of a vehicle to an axle supported position on the carriage structure for movement therewith to the forward reel transport position.

1 Claim, 9 Drawing Figures

CABLE REEL HANDLING APPARATUS FOR A VEHICLE

BACKGROUND OF THE INVENTION

Vehicle mounted cable reel handling apparatus adapted to be carried on a trailer vehicle are shown in U.S. Pat. Nos. 3,091,413 and 3,063,584. Reel handling apparatus has also been provided for pickup trucks as disclosed in U.S. Pat. Nos. 3,165,214; 3,184,082; 3,036,790 and 3,325,118. In the above patents, the apparatus generally includes vertically movable lift arms pivotally connected to the vehicle for engaging and transferring a single ground supported reel onto the vehicle for transport. The lift arms are engageable with the reel at all times even when the reel is in the transport position.

In some of the reel handling structures for trucks to handle a pair of reels for transport, the operating cylinders for the reel lift arms are arranged on the truck bed so as to appreciably limit the space for reel storage as appears in U.S. Pat. Nos. 2,876,916 and 3,902,612. The Anderson U.S. Pat. No. 3,625,380 and McVaugh U.S. Pat. No. 3,820,673 use front and rear pairs of lift arms, with a first reel lifted from the ground by rear arms being transferred to the front lift arms and carried thereon to a farward transport position. The second reel when lifted from the ground remains on the rear lift arms for transport in a position adjacent to and rearwardly of the first reel.

Although transfer of a reel from the rear lift arms to the front lift arms was generally satisfactory, the double lift arm arrangement was relatively expensive and difficult to accommodate within the limited space requirements on the truck bed, especially as restricted with the growing demand for larger side mounted tool carrying compartment units. With the compartment units extended from the truck cab to positions over and behind the truck rear wheel and axle assembly space requirements for transporting the reels become more critical.

The Hall U.S. Pat. No. 3,902,612 partially solves this problem by using transversely spaced tiltable beams extended longitudinally of the truck for receiving a reel from a pair of rear lift arms. On a controlled downward and forward tilting movement of the beams the transferred reel is rolled by gravity action to a forward transport position. However, by virtue of the lift arms being actuated by cylinders mounted on the truck bed, the transverse distance between the beams is appreciably reduced. As a result the reel has a spindle of reduced length, when lifted from the ground, which is then replaced by a longer spindle before the reel can be supported on the beams. Hall, therefore, has no provision for side compartment units and requires a manual changing of reel spindles, and a manual actuation of the tiltable beams to roll a reel to a front transport position. These disadvantages of the Hall apparatus are eliminated by the apparatus of this invention.

SUMMARY OF THE INVENTION

The reel handling apparatus is economical in cost, adapted to be mounted on a vehicle between longitudinally extended side compartment units, and efficient in operation to handle a pair of ground supported reels to transport positions on a vehicle located substantially over the vehicle rear wheel and axle assembly. The rear lift arms transfer a first reel to be transported directly to an axle supported position on a carriage structure which is movable longitudinally of the vehicle and at an elevation above the side compartment units between a forward reel transport position and a rearward reel loading position. The second reel, in the transport position therefor, is carried on the lift arms rearwardly of and adjacent to the first reel. With the carriage structure movable on tracks above the side compartment units, the lift arms in the elevated positions therefor are located rearwardly of the side compartments and are of a length to project upwardly therefrom and between the rear end sections of the tracks for coaction with the carriage structure in the transfer thereto of the first reel to be transported. The lift means and carriage structure are power operated and actuated through a single set of controls carried adjacent the rear end of the truck.

DETAIL DESCRIPTION OF A PREFERRED EMBODIMENT OF THE INVENTION

Figures 1, 2:
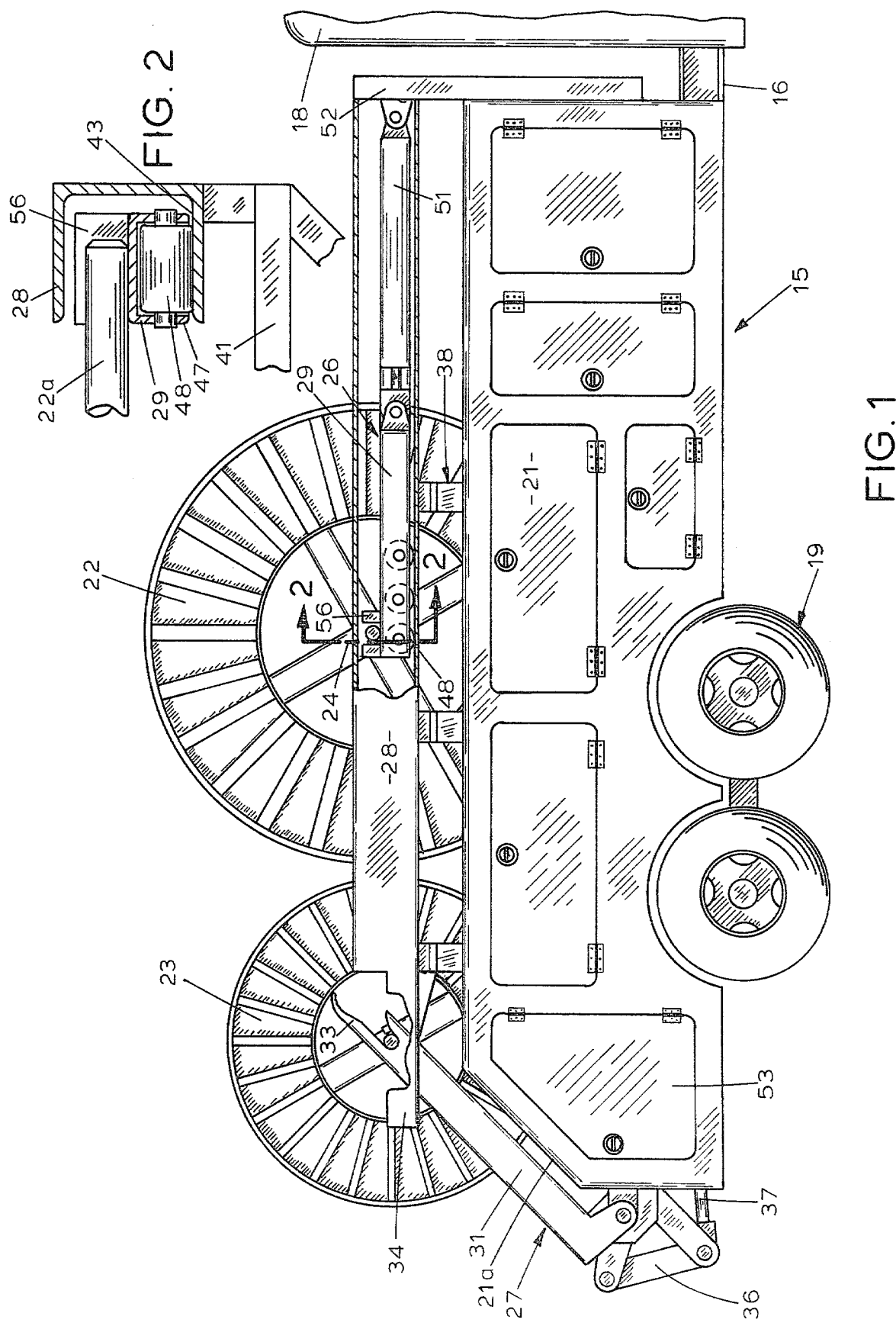
FIG. 1 is a side elevational view of the rear section of a truck showing the assembly therewith of the cable reel handling apparatus of this invention with portions broken away for clarity.
FIG. 2 is an enlarged sectional detail view taken on the line 2—2 in FIG. 1.

Referring to FIG. 1, there is shown a portion of a truck 15 that includes a chassis 16 having a truck bed 17, a cab 18 and a rear wheel and axle assembly 19 of tandem type. Arranged to each side of and mounted of the chassis 16 is a pair of transversely spaced compartment units 21 for tools and equipment required in cable laying operations. A compartment unit 21 projects upwardly from and extends longitudinally of the truck bed 17 over the full length thereof and in a covering relation with the wheels of the rear wheel assembly 19. In their transport positions, a pair of reels 22 and 23 are arranged between the side compartments 21 with the axis of the front reel 22 located in a vertical plane, indicated at 24, passing through substantially the front side of the wheel and axle assembly 19. It is seen, therefore, that the major portion of the reel weight is carried by the rear wheel assembly.

Figure 3:
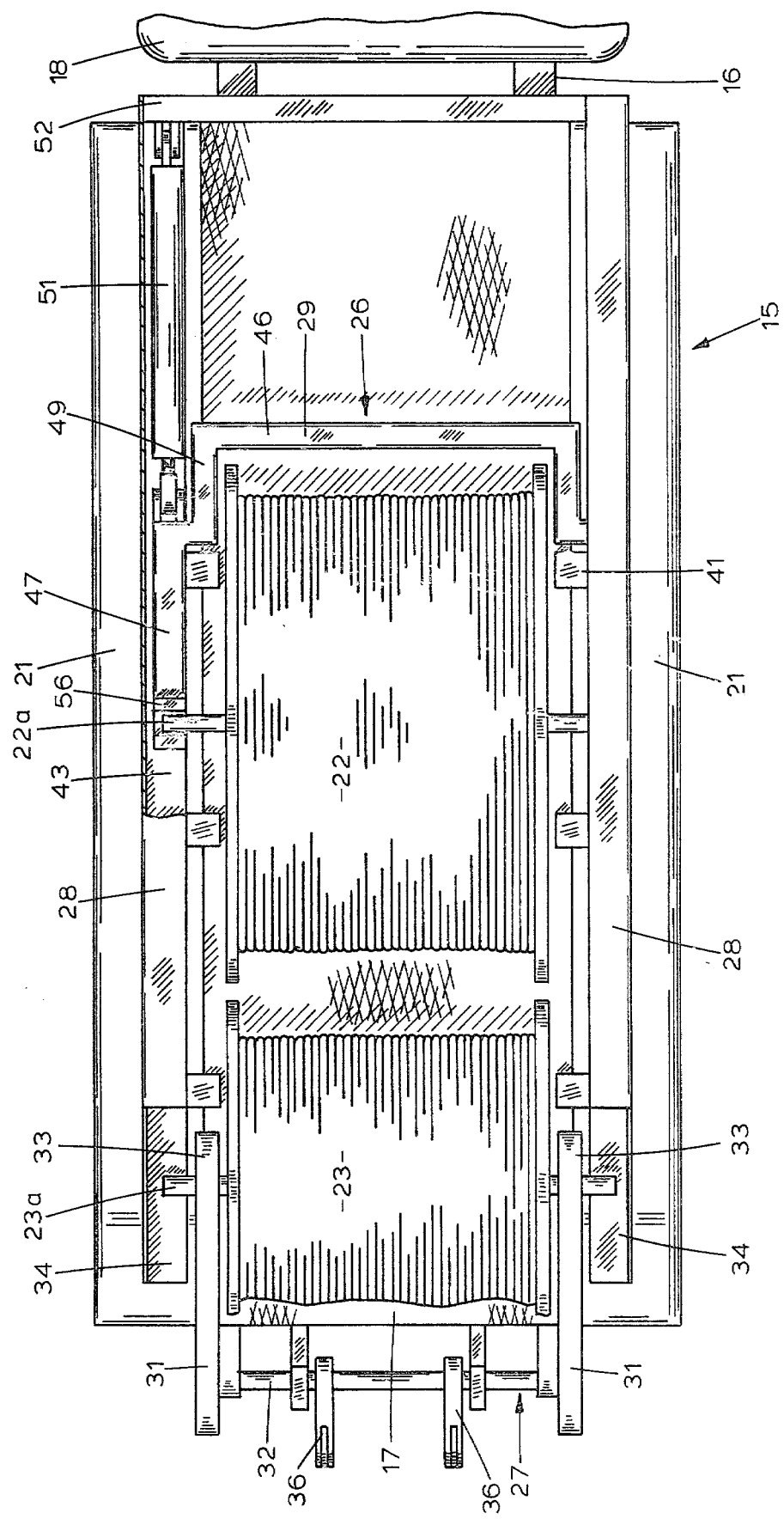
FIG. 3 is a plan view of the assembly shown in FIG. 1 with parts broken away to more clearly show the construction of the reel supporting carriage structure which forms part of the reel handling apparatus.

The reel handling apparatus of this invention, designated generally at 26, includes a vertically movable lift means 27 pivotally connected to the rear end of the vehicle chassis 16 (FIGS. 1 and 3), a pair of transversely spaced longitudinally extended track means 28 located above the compartment units 21, and a reel supporting carriage structure 29 movable on the track means 28 between a rear reel loading position and a front reel transport position.

The lift means 27 includes a pair of transversely spaced lift arms 31 mounted on a rock shaft 32 for movement from a lowered position, for engaging a ground supported reel, to an upper or elevated position for the transfer of a reel to the carriage structure 29 or for the retaining of a reel thereon for transport. To permit movement of a lift arm 31 to its elevated position, the upper side 21a of the rear surface of a compartment unit 21 is inclined upwardly and forwardly at an angle corresponding to the inclination of the elevated lift arm for mating alignment in a clearance relation therewith.

As shown in FIG. 1, when the arms 31 are in the elevated positions therefor their upper or free end sections 33 project upwardly above the upper surfaces of the compartment units 21 for disposition between and adjacent the rear terminal ends 34 of the track means 28 for a purpose to appear later. The lift arms 31 are pivotally movable to their lower and elevated positions through link structures 36 which are actuated by hydraulic cylinder assemblies 37 mounted on the chassis 16 below the truck bed 17. For a more detailed description of the structure and operation of the lift means 27, reference is made to U.S. Pat. No. 3,625,380.

Each track means 28 is carried on an upright side frame 38 having upright frame members 39 spaced longitudinally thereof and positioned against the inner surface of an adjacent compartment unit 21. With the side compartments 21 mounted on the chassis 16 along a side of the bed frame 17, the upright frame members 39 are transversely spaced a distance apart greater than the axial length of a cable reel being handled. Each upright frame member 39 carries at its upper end a laterally extended mounting plate 41 for location at a position above an adjacent compartment unit 21. An associated track means 28 is supported on the free outer ends of the mounting plates 41. As best appears in FIG. 1, the rear section 34 of each track means terminates above an upwardly and forwardly inclined upper rear surface portion 21a of a compartment unit 21.

Figure 4:
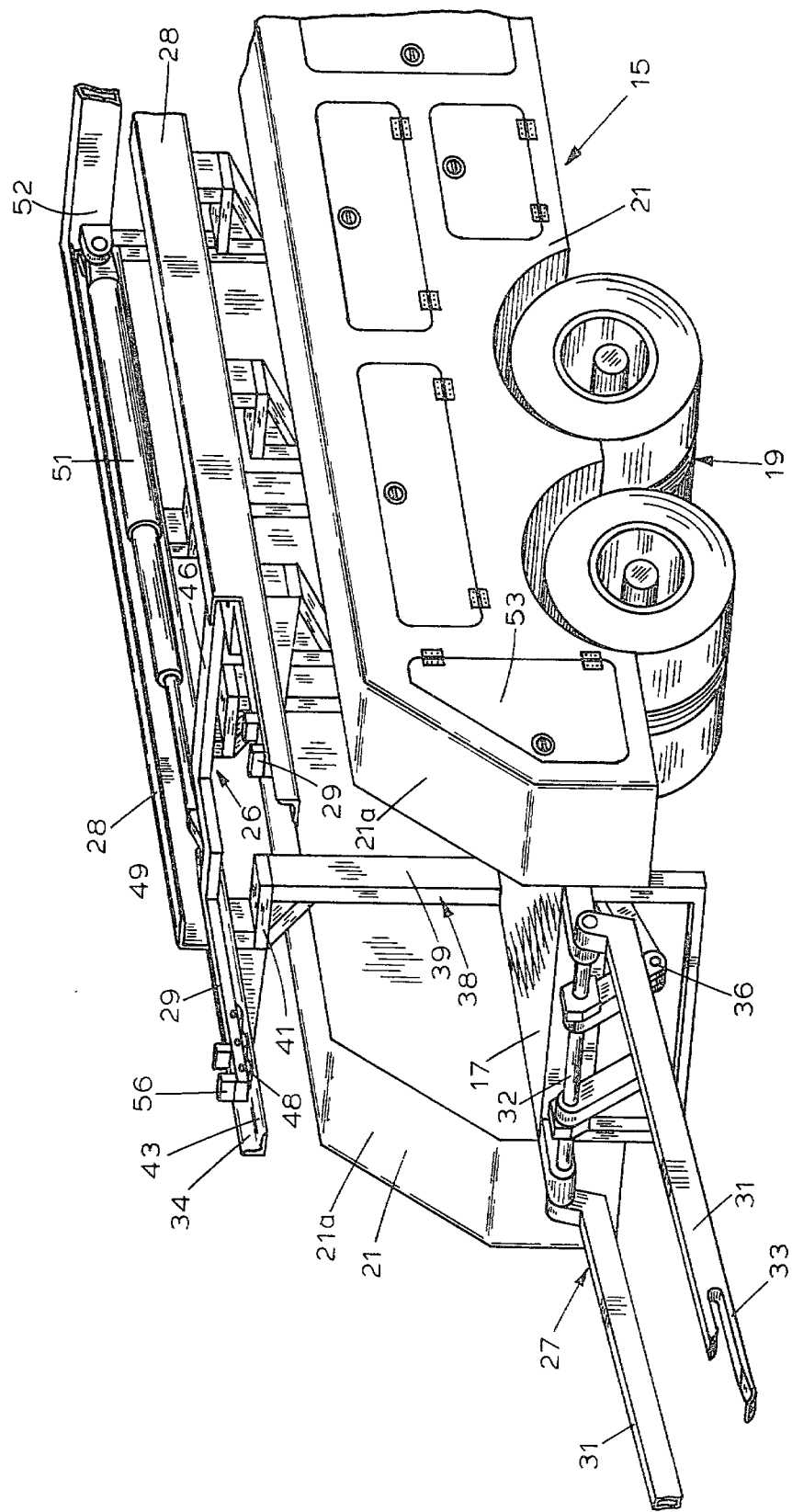
FIG. 4 is a rear perspective view of the assembly in FIG. 1 showing the vertically movable reel lift arms in lowered position and the carriage structure in the rearward reel loading position therefor, with some parts being broken away.

A track means 28 (FIGS. 2 and 4) is of a channel shape in transverse cross section with the open side thereof faced inwardly of the truck. Ridable on the lower side 43 of a track means is the carriage structure 29 which is of a generally U-shape in plan view (FIGS. 3 and 4) and has a forward base section 46 and a pair of rearwardly extended leg sections or carriage units 47. Each leg section 47 is of a channel shape in transverse cross section with its open side faced downwardly and carrying track engaging rollers 48 within its rear terminal section for rolling engagement with the lower side 43 of a track means 28.

The forward end of each leg section 47 is connected with the base section 46 by a connecting member 49 of an angulate shape providing for the alignment longitudinally with each leg section 47 of an associated telescoping type hydraulic cylinder assembly 51. Each cylinder assembly 51 is pivotally connected at its forward end to an upright supporting structure 52 mounted on the truck bed 17 and pivotally connected at its rearward end to the angulate shape connecting member 49. The base section 46 and connecting members 49 thus form a coupling means which connects the carriage units 47 together for concurrent movement longitudinally of the track means 28 in response to the extension and retraction of the hydraulic cylinder assemblies 51.

In the use of the reel handling apparatus 26, let it be assumed that the reels 22 and 23 (FIG. 1) are on the ground and are to be picked up for transport on the truck 15. For this purpose the truck 15 is manipulated relative to the reel 22 (FIG. 5) to provide for the engagement of the reel axle or spindle member 22a by the lift arms 31 when the reel 22 is located therebetween. Along with this arrangement of the lifting means 27 relative to the reel 22, the hydraulic cylinder assemblies 51 are extended to move the carriage structure 44 to its rearward reel loading position.

The upper portion of the rear sections 34 of each track means 28 is cut away (FIGS. 1 and 4) so that when the carriage structure 29 is in a reel loading position, the rear terminal sections 34 thereof have their upper surfaces exposed and open to receive thereon the projected ends of the reel spindle 22a. Projected upwardly from each rear terminal section 34 is a pair of upright longitudinally spaced stop blocks 56 for receiving therebetween a projected end of the spindle member 22a in resting engagement on a carriage unit 47 at a position above the rollers 48. The reel 22 is thus retained against movement longitudinally of the track means 28 along with being freely movable by the hydraulic cylinder assemblies 51 to a forward transport position.

Figure 5:
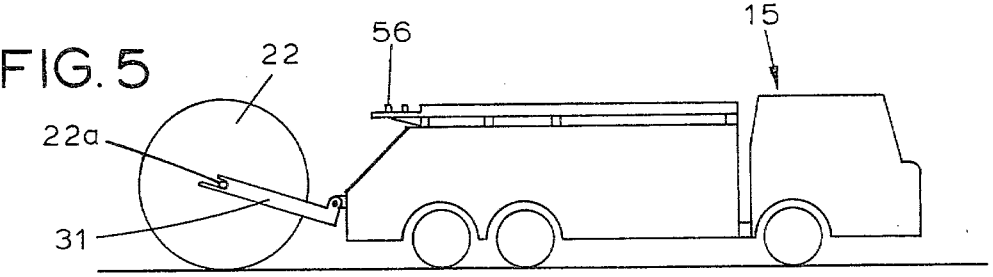
FIG. 5 is a diagrammatic illustration showing a first ground reel to be loaded engaged by the vertically movable lift arms and the carriage structure in the reel loading position therefor.
Figure 6:
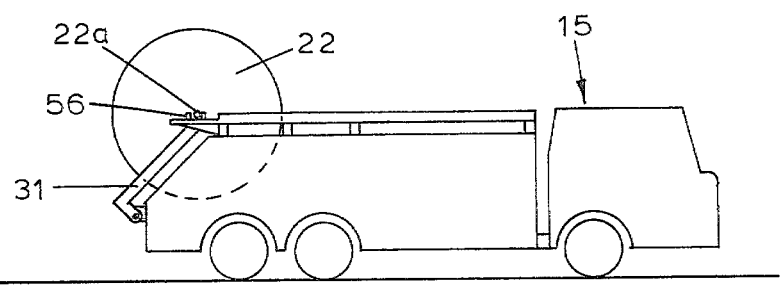
FIG. 6 is illustrated similarly to FIG. 5 and shows the first reel elevated on the lift arms for transfer to an axle supported position on the carriage structure.
Figure 7:
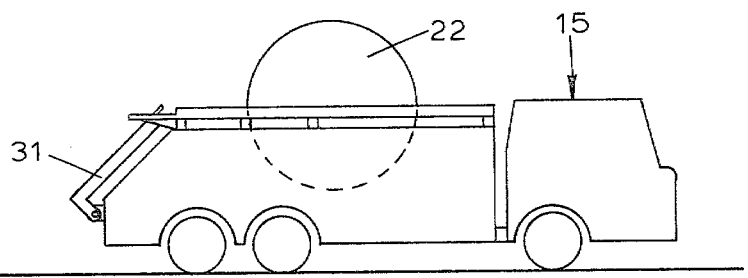
FIG. 7 is illustrated similarly to FIG. 6 and shows the lift arms in elevated position and the carriage structure moved to the forward reel transport position therefor.
Figure 8:
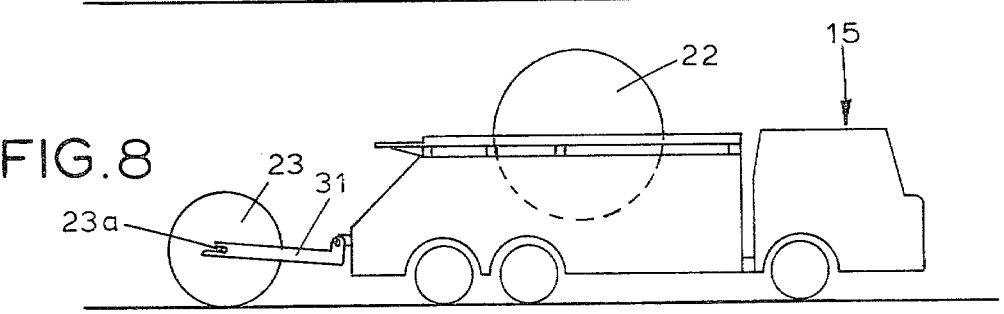
FIG. 8 is illustrated similarly to FIG. 7 and shows the lift arms lowered and engaged with a second ground reel.
Figure 9:
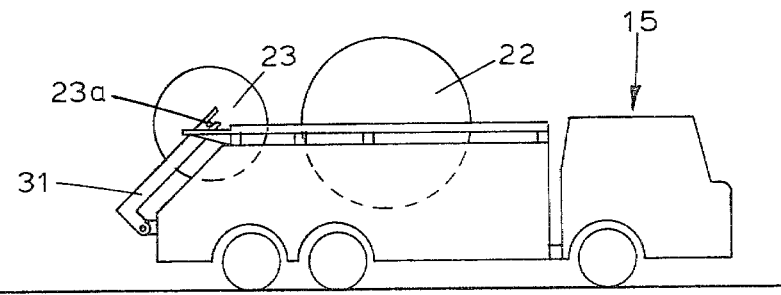
FIG. 9 is illustrated similarly to FIG. 8 and shows the lift arms elevated to support the second reel thereon in a transfer position rearwardly and adjacent to the first reel.

With the reel 22 on the ground and engaged by the lift arms 31 and with the carriage structure 29 in its rearward position, as shown in FIG. 5, the lift arms 31 are moved to elevated positions therefor (FIG. 6) to provide for the reception of the axle member 22a between the stop blocks 56 and transfer of the reel to the carriage units 47. The carriage structure 29 is then moved to the forward reel transport position therefor shown in FIG. 7. The truck 15 is then manipulated relative to the reel 23 to provide for its location between the lift arms 31 and engagement of its axle 23a by the lift arms, as shown in FIG. 8. The lift arms 31 are then elevated to their positions shown in FIG. 9 providing for the support theren of the reel 23 in a transport position located adjacent to and rearwardly of the previously loaded reel 22.

The reel 23 is removed from the truck 15 by lowering the arms 31 to their positions in FIG. 8 and then driving the truck 15 away from the reel. The unloading of the reel 22 is accomplished by merely reversing the cycle of operations described in connection with FIGS. 5, 6 and 7 in the loading of the reel 22 for transport. In the loading and unloading of the reels, the lift means 27 and carriage structure 29 are controlled by a suitable control means (not shown) for the cylinders 37 and 51, respectively, located in the compartment designated at 53 in FIG. 1.

Although the invention has been described with respect to a preferred embodiment thereof, it is to be understood that it is not to be so limited since changes and modifications can be made therein which are within the full intended scope of this invention as defined by the appended claims.

I claim:

1. A cable reel handling apparatus for a vehicle wherein the cable reel has an axle member, comprising:
    (a) a vertically movable reel lifting means mounted at the rear end of the vehicle,
    (b) a pair of longitudinally extended upright transversely spaced side frames mounted on said vehicle, said side frames spaced a distance apart greater than the axial length of a cable reel,
    (c) a linear track means carried on and extended longitudinally of each side frame adjacent the upper end thereof,
    (d) a reel supporting carriage structure extended between and within the vertical confines of said track means,
    (e) means guidably supporting said carriage structure on said track means,
    (f) linearly extendible and retractable power means mounted on said vehicle in linear alignment with said track means for moving said carriage structure to a rear reel loading position and a forward reel transport position,
    (g) said carriage structure having a generally U-shape in plan view with a forward transverse base section and rearwardly extended leg sections movable longitudinally of an adjacent associated track means,
    (h) means connecting said power means to said base section,
    (i) said base section and power means when the power means is retracted, being located forwardly of a reel in the forward transport position therefor,
    (j) said reel lifting means, when the carriage structure is in the reel loading position therefor, being movable to engage a reel on the ground rearwardly of the vehicle for transfer to an axle supported position on said carriage structure for movement therewith to the reel transport position,
    (k) each of said leg sections of the carriage structure having a rear terminal portion supported for rolling engagement on an associated track means, and
    (l) a pair of longitudinally spaced upright stop members on each of said terminal portions for receiving the reel axle member therebetween, when the carriage structure is in the reel loading position therefor.

* * * * *